(12) United States Patent
Jeong et al.

(10) Patent No.: US 10,880,680 B2
(45) Date of Patent: Dec. 29, 2020

(54) INDOOR DEVICE-FREE HUMAN COUNTING METHOD AND SYSTEM

(71) Applicant: Research & Business Foundation Sungkyunkwan University, Suwon-si (KR)

(72) Inventors: Jaehoon Jeong, Busan (KR); Seokhwa Kim, Suwon-si (KR); Daeguen Choe, Seongnam-si (KR); Keuntae Lee, Suwon-si (KR); Yong Serk Kim, Seoul (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 0 days.

(21) Appl. No.: 16/716,988

(22) Filed: Dec. 17, 2019

(65) Prior Publication Data
US 2020/0196091 A1    Jun. 18, 2020

(30) Foreign Application Priority Data

Dec. 17, 2018    (KR) .......................... 10-2018-0163071

(51) Int. Cl.
*H04W 4/021* (2018.01)
*H04B 17/27* (2015.01)
*H04W 4/33* (2018.01)

(52) U.S. Cl.
CPC ............. *H04W 4/021* (2013.01); *H04B 17/27* (2015.01); *H04W 4/33* (2018.02)

(58) Field of Classification Search
CPC ......... H04W 4/021; H04W 4/33; H04B 17/27

USPC ...................................................... 455/456.1
See application file for complete search history.

(56) References Cited

U.S. PATENT DOCUMENTS

| | | | |
|---|---|---|---|
| 2016/0315682 A1* | 10/2016 | Liu .................... | H04W 24/08 |
| 2017/0343658 A1* | 11/2017 | Ramirez ............ | G08B 13/2491 |
| 2019/0007256 A1* | 1/2019 | Chen .................... | H04L 27/362 |
| 2019/0178980 A1* | 6/2019 | Zhang .................... | G01S 7/415 |
| 2020/0137858 A1* | 4/2020 | Boonen ................ | H05B 45/10 |

FOREIGN PATENT DOCUMENTS

| | | |
|---|---|---|
| JP | 2000-295167 A | 10/2000 |
| JP | 2013-221311 A | 10/2013 |
| JP | 2017-134633 A | 8/2017 |

OTHER PUBLICATIONS

Electronic Frog Eye: Counting Crowd Using WiFi Xi et al. (Year: 2014).*
WiDir: Walking Direction Estimation Using Wireless Signals Wu et al. (Year: 2016).*
Korean Notice of Allowance dated May 28, 2020 in counterpart Korean Patent Application No. 10-2018-0163071 (2 pages in Korean).

* cited by examiner

*Primary Examiner* — William Nealon
(74) *Attorney, Agent, or Firm* — NSIP Law

(57) ABSTRACT

The present disclosure relates to an indoor device-free human counting method and a system for the method. The present disclosure may estimate the number of humans present on a radio link accurately based on an amount of attenuation of a received radio signal and an amount of change of the received radio signal over time.

8 Claims, 12 Drawing Sheets

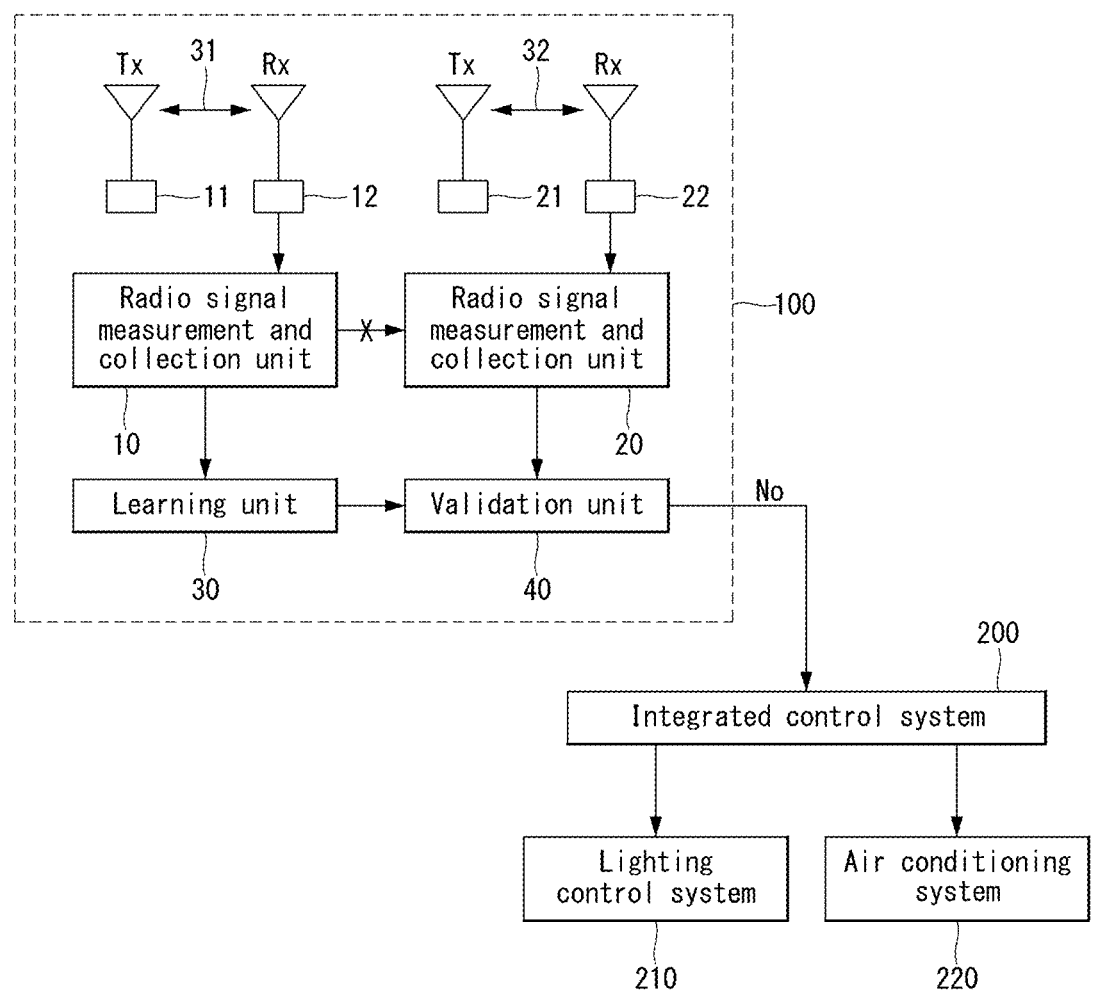
[FIG. 1]

[FIG. 2]
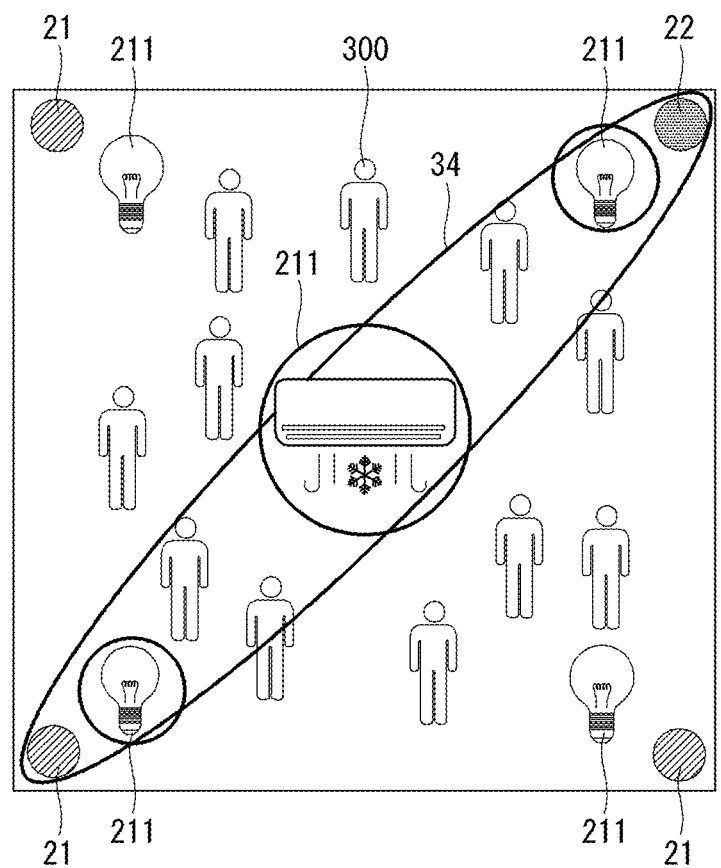

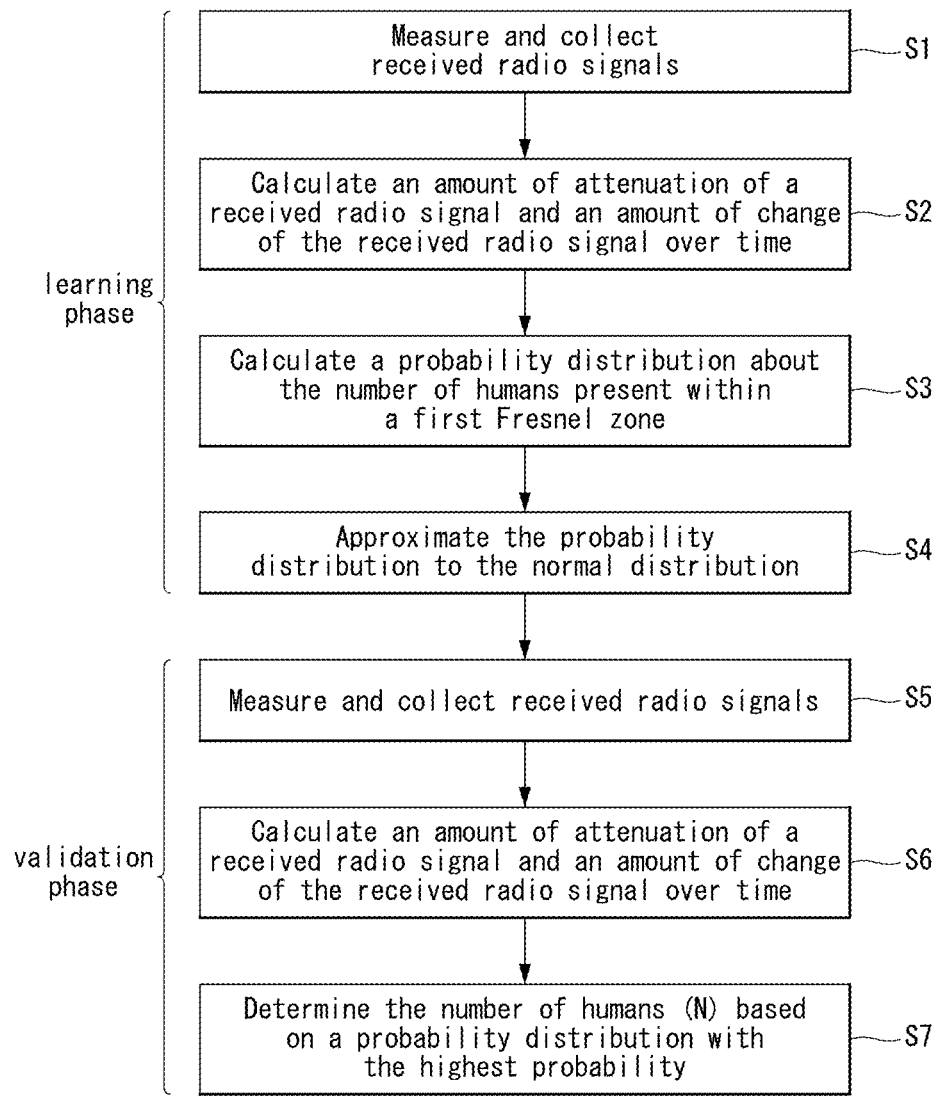

[FIG. 4a]
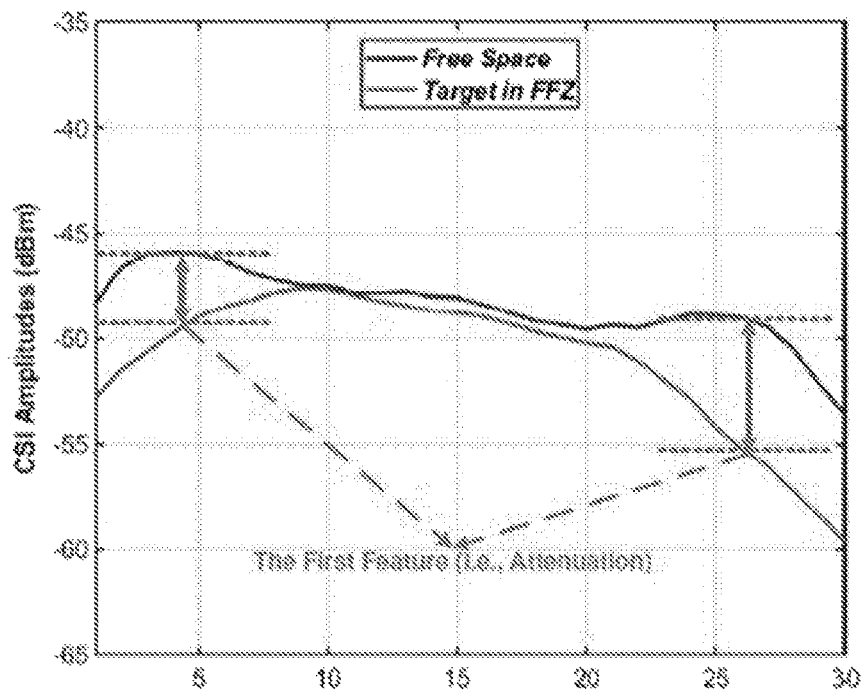
[FIG. 4b]
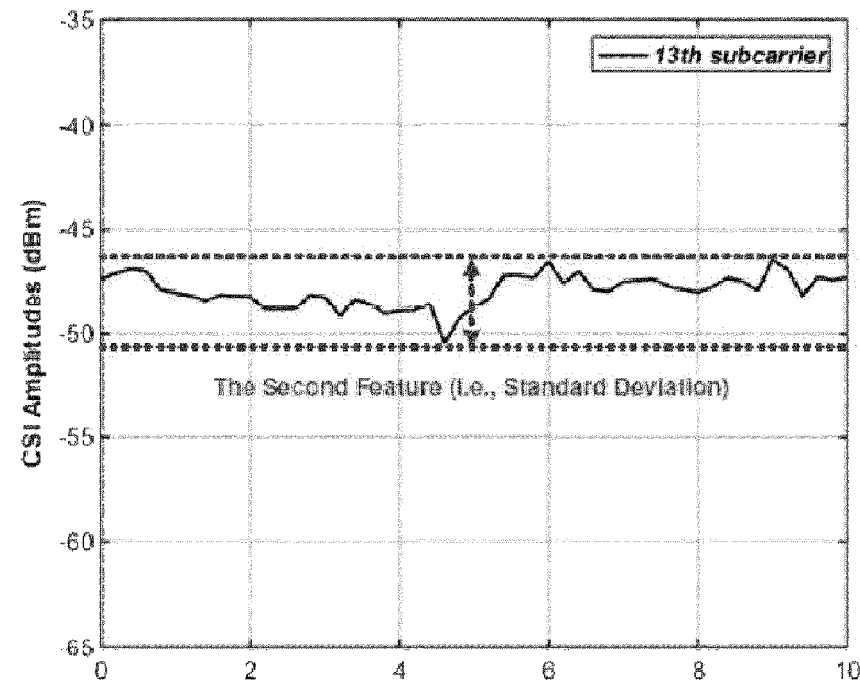

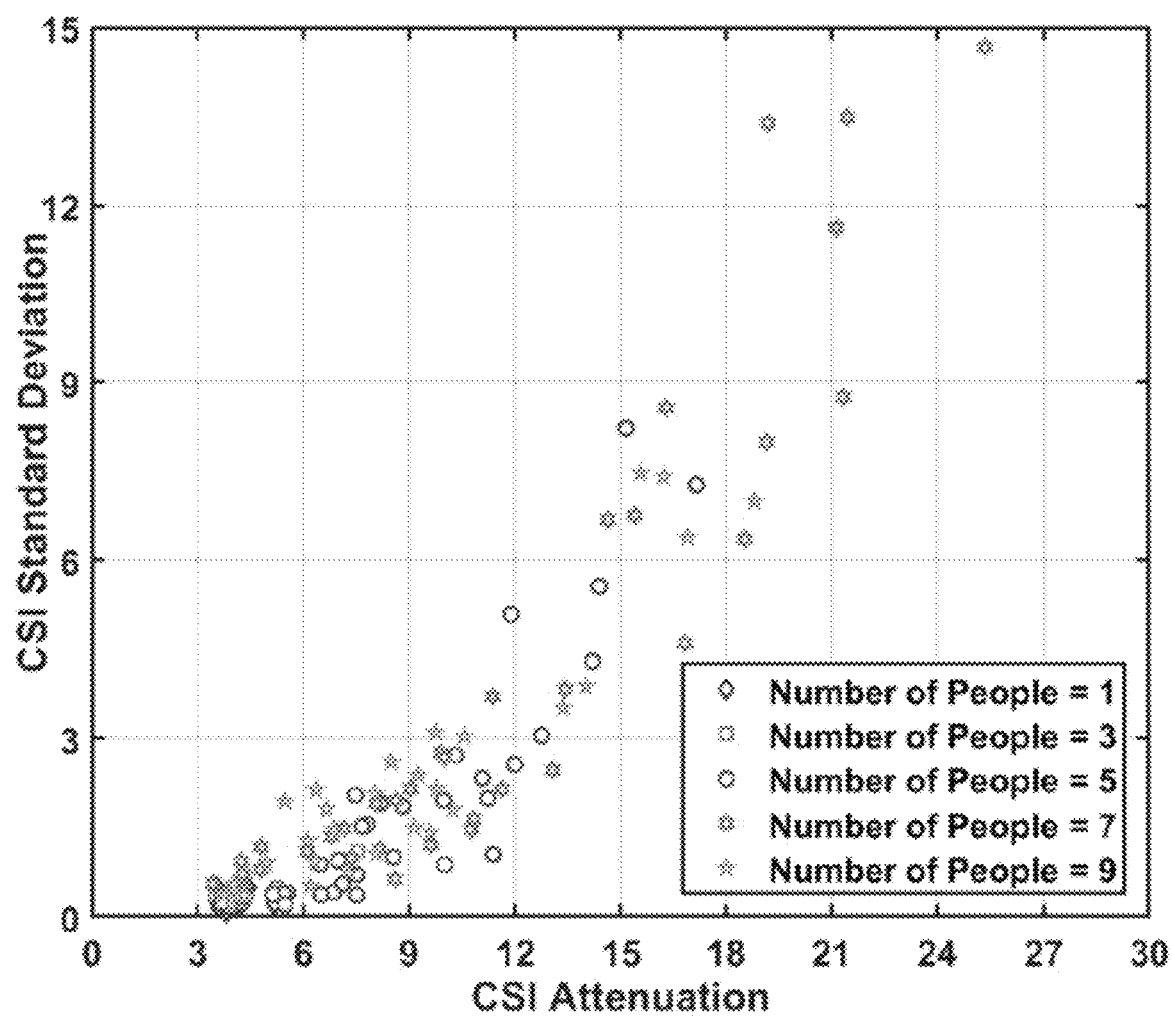
[FIG. 5]

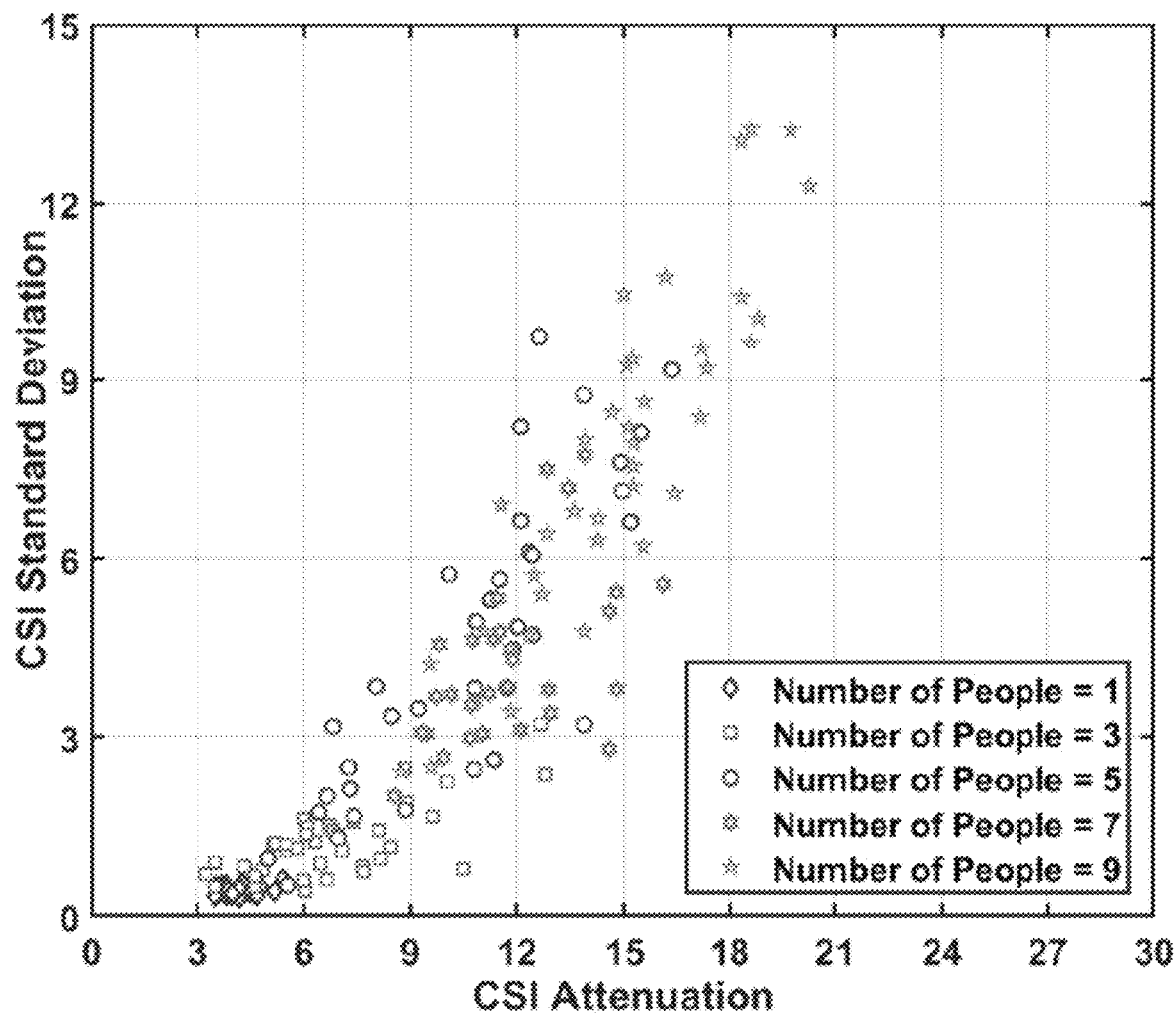
[FIG. 6]

[FIG. 7]
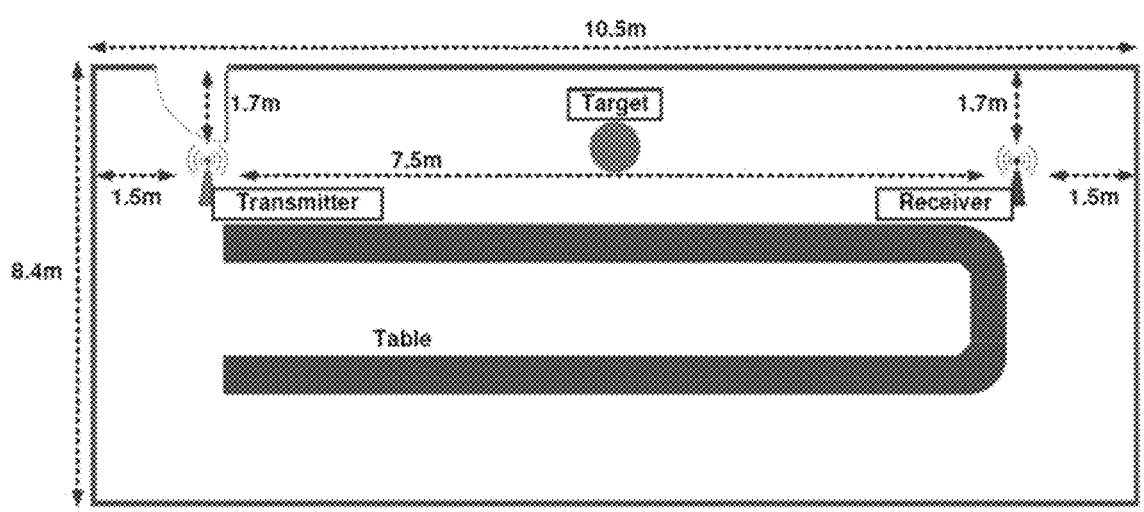

[FIG. 8]
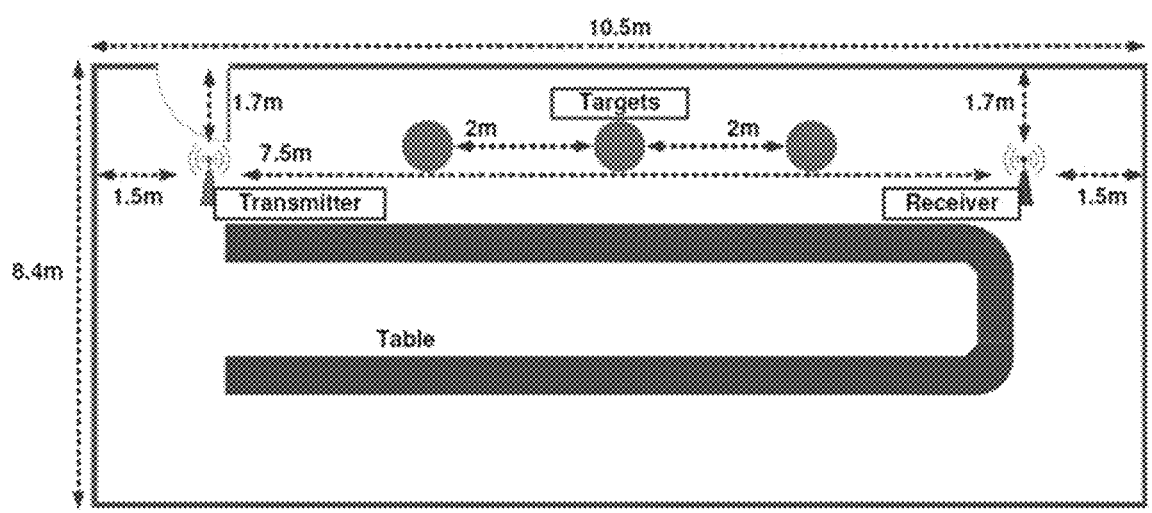

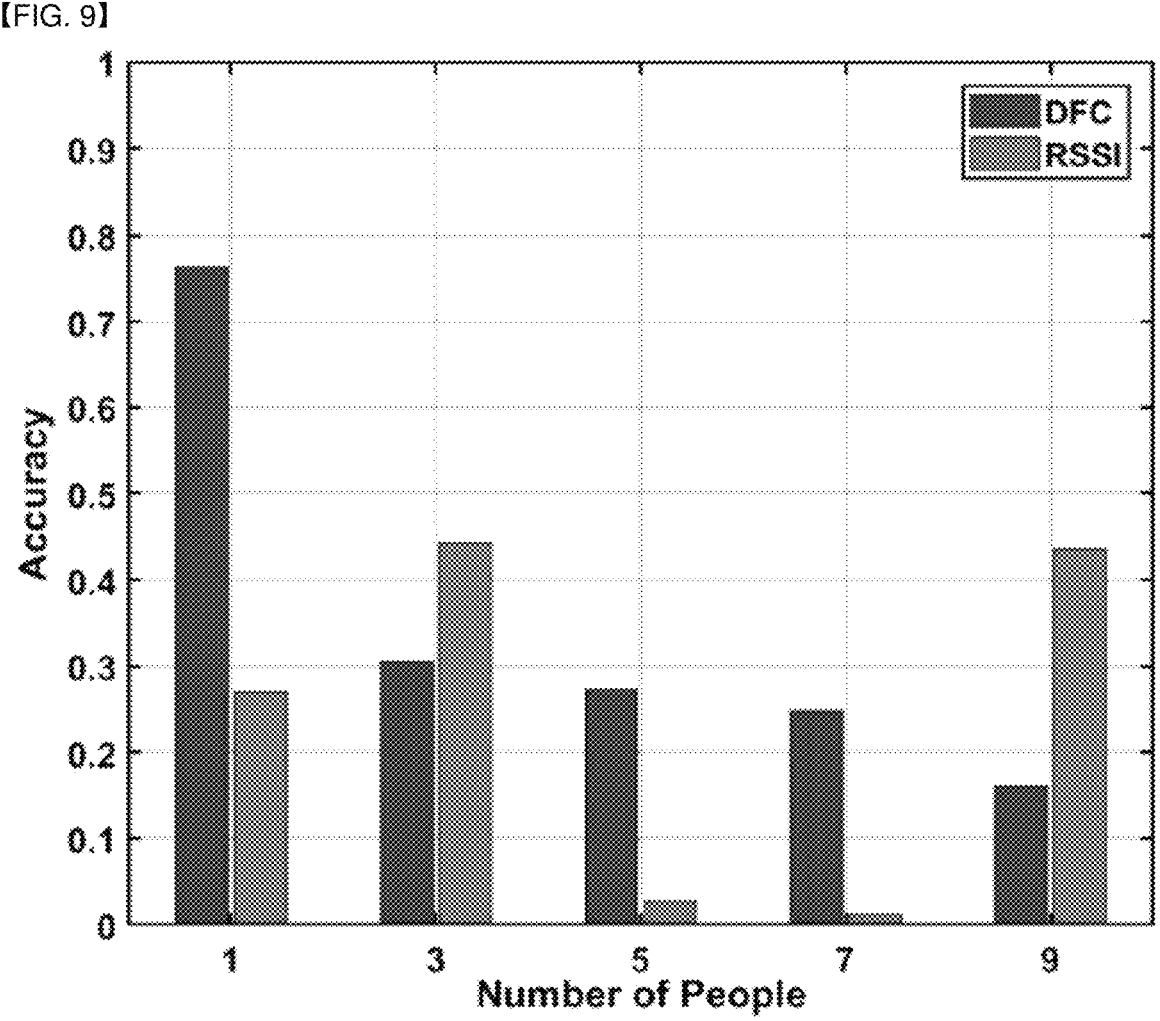
[FIG. 9]

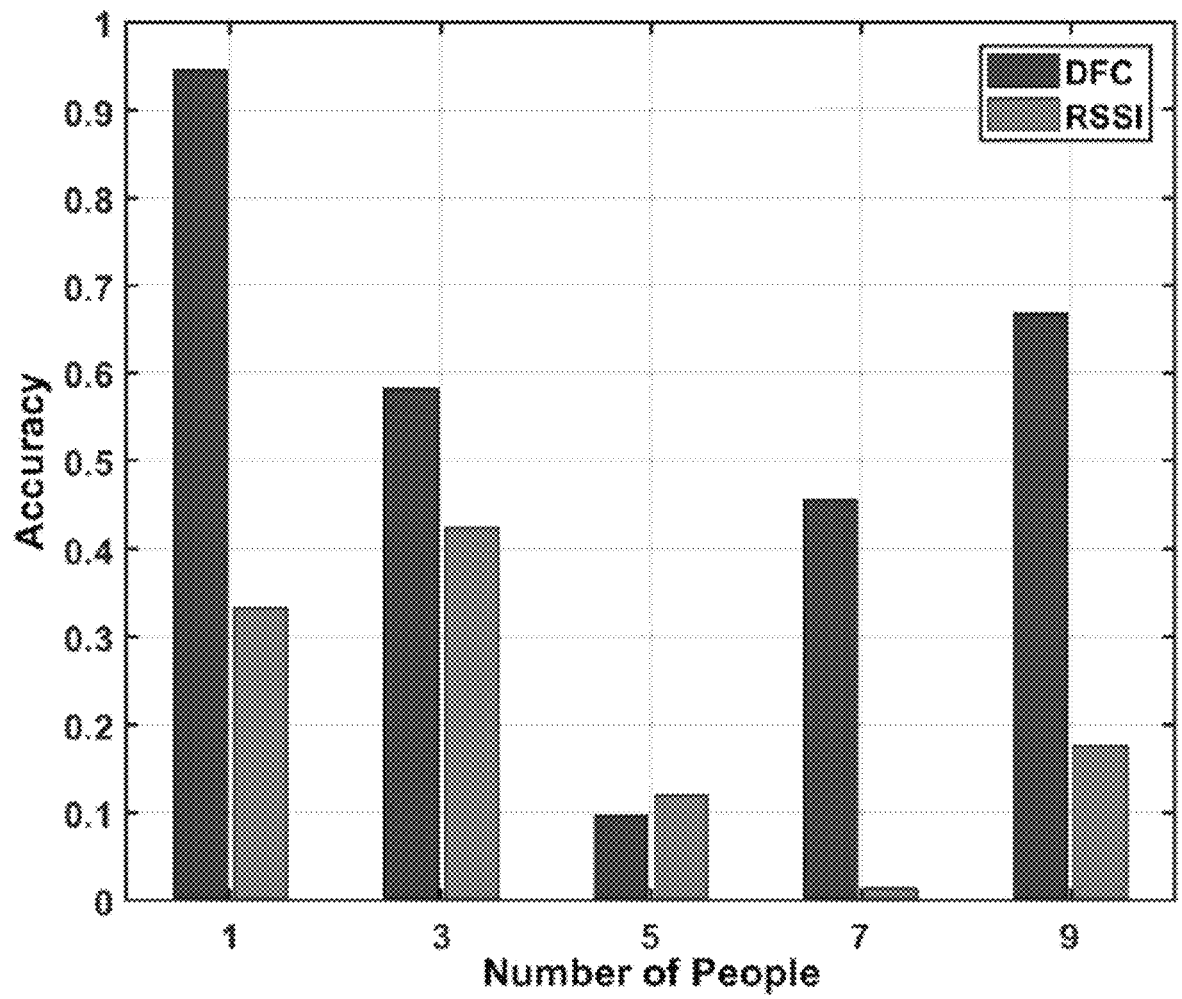
[FIG. 10]

[FIG. 11]
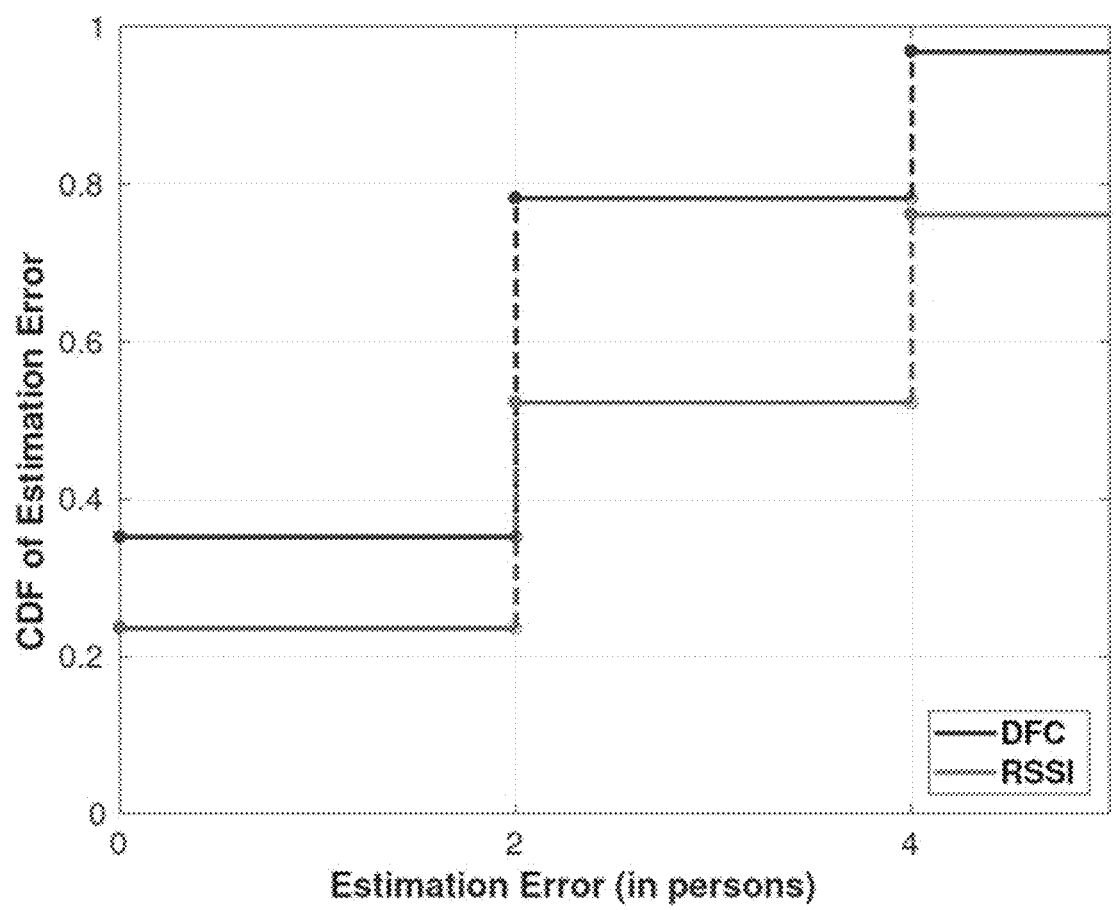

[FIG. 12]
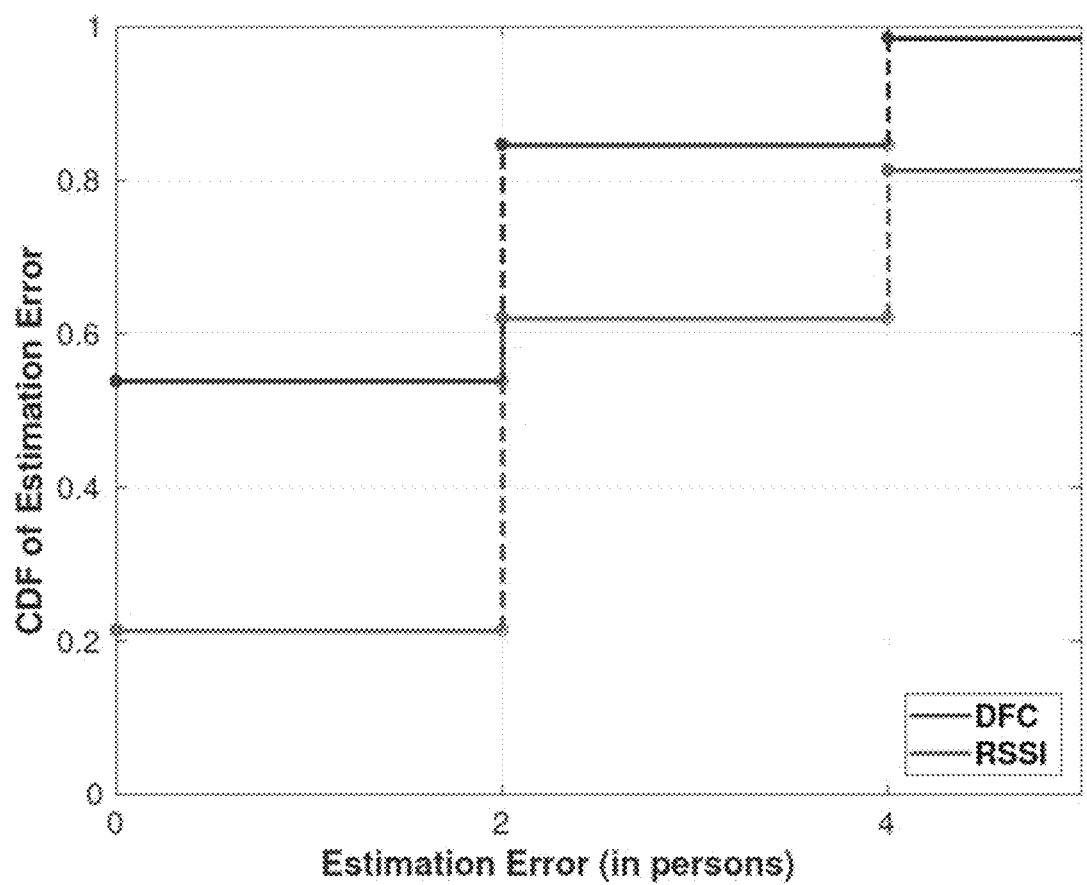

INDOOR DEVICE-FREE HUMAN COUNTING METHOD AND SYSTEM

CROSS-REFERENCE TO RELATED APPLICATION

This application claims the benefit under 35 U.S.C. 119(a) of Korean Patent Application No. 10-2018-0163071 filed on Dec. 17, 2018, in the Korean Intellectual Property Office, the entire disclosure of which is incorporated herein by reference for all purposes.

TECHNICAL FIELD

The present disclosure relates to an indoor device-free human counting method for estimating the number of humans present in a radio link based on an analysis of a wireless communication signal transmitted between a transmitter and a receiver forming the radio link and a system for the method.

BACKGROUND ART

Wireless sensor network technology is an essential technology operated in conjunction with the Internet of Things (IoT). The wireless sensor network technology may optimize indoor lighting or air conditioning by counting the number of humans present indoors, which thereby makes the indoor environment become more pleasant and reduce power consumption.

Conventional human counting methods using the wireless sensor network technology estimate the number of humans present in an indoor environment via communication with a wireless access point (AP) through user devices (for example, smartphones or tablet PCs) or via additional devices such as infrared sensors, ultrasonic sensors, and cameras. However, since the conventional human counting methods are unable to recognize humans in such an indoor environment where no user devices or no additional devices are present, there are many limitations for the conventional methods to be used in various environments. Therefore, to implement the conventional human counting methods, additional devices needed for a human counting system have to be taken into account as early as the design phase of a building.

DISCLOSURE

Technical Problem

An embodiment of the present disclosure provides an indoor device-free human counting method and a system capable of counting the number of humans present in an indoor environment with a high accuracy without employing user devices needed to estimate the number of humans in the indoor environment or additional devices such as infrared sensors, ultrasonic sensors, or cameras.

Technical Solution

An indoor device-free human counting system according to the present disclosure comprises a transmitter and a receiver forming a radio link through which a radio signal is transmitted; and a human counting unit calculating an amount of attenuation of a received radio signal and an amount of change of the received radio signal over time by analyzing the radio signal received by the receiver and estimating the number of humans present within a first Fresnel zone of the radio link based on the calculation result.

An indoor device-free human counting system according to the present disclosure calculates an amount of attenuation of a received radio signal and an amount of change of the received radio signal over time by analyzing the radio signal received by the receiver and estimates the number of humans present within a first Fresnel zone of the radio link based on the calculation result.

The received radio signal includes Channel State Information (CSI).

The human counting unit includes a learning unit learning the number of humans present on the radio link in advance by calculating probability distributions between the channel state information and the number of humans based on an amount of attenuation of the received radio signal and an amount of change of the received radio signal over time; and a validation unit calculating an amount of attenuation of a radio signal received through a radio link in an actual indoor environment and an amount of change of the received radio signal over time, estimating the number of humans present on the radio link by selecting a case with the highest probability among probability distributions obtained by the learning unit from the calculation result, and outputting human counting information including the number of humans.

The method according to the present disclosure further comprises forming a radio link through which a radio signal is transmitted between a transmitter and a receiver.

An indoor device-free human counting method according to the present disclosure estimates the number of humans present in a Fresnel zone by using the system.

Advantageous Effects

The present disclosure may determine the number of humans present on a radio link between legacy transmitters and receivers accurately without involving separate user devices or additional devices. The human counting system according to the present disclosure may effectively control wasted power of electronic devices and control options thereof (for example, a preset temperature of an air conditioner) within a building in association with an integrated control system, thereby optimizing power consumption.

DESCRIPTION OF DRAWINGS

FIG. 1 is a block diagram illustrating an indoor device-free human counting system according to an embodiment of the present disclosure.

FIG. 2 illustrates an indoor space in which lighting and an air conditioner are disposed.

FIG. 3 is a flow diagram illustrating an indoor device-free human counting method according to an embodiment of the present disclosure.

FIGS. 4(a) and 4(b) depict an experimental result illustrating one example of extracting features of channel state information extracted in a learning phase.

FIG. 5 is an experimental result illustrating a relationship between channel state information and the number of humans in a first Fresnel zone when humans present on a radio link do not move.

FIG. 6 is an experimental result illustrating a relationship between channel state information and the number of humans within a first Fresnel zone when humans present on a radio link move.

FIG. 7 illustrates an experimental setting when only one person is present in a laboratory.

FIG. 8 illustrates an experimental setting when three people are present in the laboratory.

FIG. 9 is an experimental result illustrating estimates according to the present disclosure and a comparative example when people on a radio link do not move.

FIG. 10 is an experimental result illustrating estimates according to the present disclosure and a comparative example when people on a radio link move.

FIG. 11 is an experimental result illustrating accuracy of an estimate of the number of humans when people on a radio link do not move.

FIG. 12 is an experimental result illustrating accuracy of an estimate of the number of humans when people on a radio link move.

MODE FOR DISCLOSURE

The advantages and characteristics of the present disclosure and a method for achieving them will be clearly understood by referring to the embodiments described later in detail together with the appended drawings. The present disclosure is not limited to the embodiments disclosed below but may be implemented in various other forms; the disclosed embodiments are provided simply to make the present disclosure complete and help those skilled in the art to which the present disclosure belongs understand the technical scope of the disclosure in a comprehensive manner; therefore, the present disclosure may be defined only by the technical scope of the appended claims.

Throughout the specification, the same notations actually refer to the same elements. In describing the present disclosure, if it is determined that a detailed description of known technology incorporated herein unnecessarily obscure the gist of the present disclosure, the detailed description thereof will be omitted.

The following embodiments may be associated or combined with each other partially or in their entirety and may be operated or driven together in various technical ways. Individual embodiments may be implemented independently from each other or implemented together in conjunction with each other.

Referring to FIGS. 1 and 2, the human counting system 100 according to the present disclosure includes a radio signal measurement and collection unit 10, 20 and a human counting unit. The human counting unit includes a learning unit 30 and a validation unit 40.

The human counting unit analyzes a radio signal received by a receiver 32, calculates an amount of attenuation of the received radio signal and an amount of change of the received radio signal over time, and based on the calculation result, determines the number of humans present within a first Fresnel zone of a radio link.

The first radio signal measurement and collection unit 10 is connected to a transmitter (Tx) 11 and a receiver (Rx) 12 forming a radio link 31. The transmitter 11 and the receiver 12 are separated from each other by a predetermined distance in an indoor environment. The transmitter 11 may be an indoor wireless access point (AP).

The transmitter 11 and the receiver 12 may be installed in an experimental site or installed indoors to count the number of people in an actual, everyday indoor environment. In the latter case, the transmitters 11, and the receivers 12, 22 connected to the first radio signal measurement and collection unit 10 and the second radio signal measurement and collection unit 20 may be the same devices.

The first radio signal measurement and collection unit 10 analyzes strength of a radio signal received through the receiver 12, calculates an amount of attenuation of the received radio signal including channel state information (CSI) and an amount of change of the received radio signal over time, and stores the calculation result into a memory. The learning unit 30 calculates a probability distribution between the channel state information (CSI) and the number of humans based on the amount of attenuation and the amount of temporal change of the received radio signal collected by the first radio signal measurement and collection unit 10 and learns the number of humans present on a radio link in advance. Here, the number of humans may be the number of people present within a first Fresnel zone of a radio link 31, 32.

The second radio signal measurement and collection unit 20 is connected to a transmitter 21 and a receiver 22 forming a radio link 32. The transmitter 21 and the receiver 22 are installed in an actual indoor environment where determination of the number of people is required. The second radio signal measurement and collection unit 20 analyzes strength of a radio signal received through the receiver 22, calculates an amount of attenuation of the received radio signal and an amount of change of the received radio signal over time, and stores the calculation result into the memory.

The validation unit 40 calculates an amount of attenuation and an amount of temporal change of a received radio signal including channel state information (CSI) from the radio signal received through a radio link 32 in an actual indoor environment. The validation unit 40 selects a case with the highest probability among probability distributions obtained by the learning unit from the calculation result of the amount of attenuation and temporal change of the received radio signal, estimates the number of humans 300 present on the radio link 32, and outputs human counting information (N) including the number of humans 300.

The radio links 31, 32 between the transmitters 11, 21 and the receivers 12, 22 may be formed by radio signals modulated according to the Orthogonal Frequency-Division Multiplexing (OFDM) scheme.

OFDM communication splits one data stream into a plurality of data streams to transmit a large amount of data efficiently and transmits each split data streams through a plurality of subcarriers. The frequency region of a main channel is divided into a plurality of sub-channels, and subcarriers are transmitted through the plurality of sub-channels. Each information of the sub-channels through which subcarriers are transmitted may be expressed in terms of channel state information (CSI). The channel state information (CSI) is used as a signal to control channels for smooth communication in high-performance communication equipment (for example, Wi-Fi). Before a radio signal transmitted from the transmitter 11, 21 reaches the receiver 12, 22, the radio signal is affected by reflection, diffraction, and attenuation of radio waves due to obstacles along its propagation path.

The signal strength of a received radio signal is affected by reflection or diffraction due to an obstacle. A radio signal received by the receiver 12, 22 is affected by not only a radio wave received directly from the transmitter 11, 21 but also diffracted or reflected waves. The first Fresnel zone refers to a region extending to a first peak of the field strength along the line of sight of a propagating radio wave. If there is virtually no obstacle in the first Fresnel zone, loss of a propagating radio wave in the first Fresnel zone is the same as the amount of loss in the free space.

If the loss of radio waves is larger than the loss in the free space, it is highly likely that an obstacle exists in the first Fresnel zone. The first Fresnel zone is set as a region used to install an antenna at a suitable position when communication between buildings is conducted.

The present disclosure determines existence of an obstacle, namely a human 300, within the first Fresnel zone through which a radio signal generated by the transmitter 11, 21 propagates to the receiver 12, 22. Furthermore, the present disclosure may estimate the number of humans 300 present on a radio link based on a correlation between an amount of attenuation of a received radio signal and the number of humans.

In wireless communication between the transmitter 11, 21 and the receiver 12, 22, signal strength of a radio signal received by the receiver 12, 22 is affected by obstacles in the first Fresnel zone. However, it should be noted that signal strength change of a received radio signal in an indoor environment does not necessarily imply existence of obstacles in the first Fresnel zone. This is so because a radio signal in an indoor environment is affected by reflection and diffraction due to walls or furniture in addition to the reflection or diffraction due to obstacles within the first Fresnel zone.

To determine strength of a received radio signal, reception sensitivity of received signal strength indicator (RSSI) may be used. Since RSSI provides only the information of a main channel among all the signal channels generated during an OFDM modulation process, it is difficult to know only from the RSSI which causes the strength change of a radio signal. In contrast, since CSI contains a plurality of subcarrier information, it is easy to determine which causes change of radio signal strength. Therefore, the present disclosure measures change of CSI to measure an amount of change of received radio signal strength. To effectively filter carriers of a radio signal received by the receiver 12, 22, the present disclosure may measure the change of CSI by detecting signal components larger than a predetermined threshold value.

The human counting system 100 may be connected to the integrated control system 200. The integrated control system 200 may be connected to a lighting control system 210 and an air conditioning system 22 of a building. The integrated control system 200 manages indoor lighting, heating and cooling, air conditioning, and power consumption of a building in an integrated manner. The lighting control system 210 may turn on or off lights 211 or adjust brightness of the lights for each of a plurality of indoor spaces of the building under the control of the integrated control system 200. The air conditioning system 22 may turn on or off the air conditioners 221 or adjust the air conditioner output for each of a plurality of indoor spaces of the building under the control of the integrated control system 200. The air conditioner 221 may include an indoor heater or cooler, indoor air cleaner and so on.

The integrated control system 200 may transmit an enable signal to the air conditioning system 22 together with a device identification code (ID) so that the indoor air conditioners may be turned on in such an indoor space where people 300 are deemed to be present according to human counting information (N) from the human counting system 100. The device identification code (ID) is used to distinguish the respective lights and air conditioners installed in the indoor spaces. On the other hand, the integrated control system 200 may transmit the identification code (ID) and a disable signal to the air conditioning system 22 so that the indoor air conditioners may be turned off in such an indoor space where people 300 are deemed to be absent according to human counting information (N) from the human counting system 100. The integrated control system 200 may transmit an enable signal to the lighting control system 210 together with an identification code (ID) so that indoor lights may be turned on in such an indoor space where people 300 are deemed to be present according to human counting information (N) from the human counting system 100. On the other hand, the integrated control system 200 may transmit the identification code (ID) and a disable signal to the lighting control system 210 so that the indoor lights may be turned off in such an indoor space where people 300 are deemed to be absent according to human counting information (N) from the human counting system 100.

FIG. 3 is a flow diagram illustrating an indoor device-free human counting method according to an embodiment of the present disclosure.

Referring to FIG. 3, a human counting method according to the present disclosure includes a learning phase and a validation phase. The learning phase is processed in the first radio signal measurement and collection unit 10 and the learning unit 30. The learning phase includes a first to fourth steps (S1 to S4). The validation phase is processed in the second radio signal measurement and collection unit 20 and the validation unit 40. The validation phase includes a fifth to seventh steps (S5 to S7).

The first step S1 measures and collects channel state information (CSI) from a received radio signal of a radio link 31 to learn the correlation between the channel state information (CSI) and the number of humans. The CSI may include power reduction and scattering information. Raw data of the CSI is affected by obstacles and a structure of the corresponding indoor space.

The second step S2 analyzes the CSI of the first step (S1) and calculates an amount of attenuation (first feature) and an amount of temporal change (second feature) of a received radio signal. The CSI collected in the second step S2 may be divided into fine-grained subcarriers which are set to P segments. Bootstrapping is performed for each segment. During this process, an amount of attenuation and an amount of temporal change of a received radio signal are measured in terms of amplitude values of a received radio signal in an indoor space where humans are present and amplitude values of the received radio signal when human are absent.

The third step S3 calculates an amount of attenuation and an amount of temporal change of a received radio signal by using the first and second features obtained in the second step S2.

FIGS. 4(a) and 4(b) depict is an experimental result illustrating one example of extracting features of CSI of an indoor space without targets and features of CSI of an indoor space with targets. FIG. 4(a) shows attenuation of CSI in the presence of humans on a radio link 32, and the first feature may be calculated as an average of signal attenuation values from two subcarriers. The first feature represents an amount of attenuation of strength of a received radio signal. FIG. 4(b) shows a second feature detected from the amplitude of the thirteenth subcarrier. The second feature represents an amount of temporal change of strength of a received radio signal. It should be noted that the present disclosure selects a standard deviation of samples of the thirteenth subcarrier as the second feature rather than standard deviations of samples of all of the subcarriers. In the experiment, to minimize the effect of samples far from the average value, 10 samples of subcarriers are used in the order of smaller to largest standard deviation.

The fourth step S4 calculates the average and variation of the two features of the received radio signal by using the bootstrapped data and calculates a probability distribution by approximating Eqs. 1 and 2 below to the normal distribution. At this time, each probability distribution may be calculated for the cases where one, three, or n (where n is a natural number) humans are present on the radio link 32.

$$P(\omega_n | x) = \frac{P(x|\omega_n)P(\omega_n)}{P(x)} \quad \text{[Eq. 1]}$$

$$P(x|\omega_n) = (2\pi)^{-2/2} |\sum_n|^{-1/2} \exp\left[-\frac{1}{2}(x-\mu_n)^T \sum_n^{-1}(x-\mu_n)\right] \quad \text{[Eq. 2]}$$

x represents two features obtained from CSI, and $\omega_n$ represents a case where n people are present in the first Fresnel zone. Therefore, $P(\omega_n|x)$ represents a probability that given CSI people are present in the first Fresnel zone. $P(x|\omega_n)$ may be expressed by Eq. 1 according to Bayes rule. Provided that P(x) is independent of the number of humans n, and $P(\omega_n)$ yields the same value regardless of n, $P(\omega_n|x)$ may be compared once $P(x|\omega_n)$ is calculated. $P(x|\omega_n)$ may be approximated by the normal distribution and expressed by Eq. 2. In Eq. 2, $\Sigma_n$ is a covariance matrix for the two features when there are n people in the first Fresnel zone, and $\mu_n$ is an average vector of the two features.

Although bootstrapping data is applied to preprocessed fine-grained subcarriers to calculate the probability distribution of the population, bootstrapping is used for validating a hypothesis or applying random sampling before calculating a metric such as the statistical mean and standard deviation. Bootstrapping allows data duplication. Bootstrapping may be used for determining a probability distribution of the population even if the number of measured samples is not sufficient and the distribution of a collected data set is not clearly defined. To calculate the probability distribution of the population, samples may be shuffled to generate various data sets.

In the experiment according to the present disclosure, CSI data were collected five times per second. When data were collected for about 5 minutes, the total number of samples of subcarriers amounted to 1,500. In the learning phase, CSI data was collected for the number of humans 0, 1, 3, and n, which were measured five times for 5 minutes to check how many people were present on the radio link 32. The received radio signal preprocessed in the experiment was divided into 25 segments, and standard deviation of preprocessed subcarrier samples and average attenuation were extracted for each segment to apply bootstrapping. For the CSI data of a received radio signal collected without knowing the number of humans present, features were extracted via the method described above, and the number of humans was estimated based on a probability model. In the learning phase, average attenuation and standard deviation of the amplitude of a received radio signal were calculated by setting the number of bootstrapping to 100 for all of the CSI of subcarriers for each bootstrapping period.

The fifth step S5 measures and collects CSI from a received radio signal of the radio link 32 to determine the actual number of humans. Like the learning phase, the sixth step S6 analyzes collected CSI data to calculate an amount of attenuation and an amount of temporal change of strength of a received radio signal.

The seventh step S7 selects a probability distribution showing the highest probability among the probability distributions obtained in the learning phase and determines the number of humans within the first Fresnel zone of the radio link 32.

In other words, the features extracted from the calculation result of the sixth step S6 are compared with the probability distributions already calculated in the learning phase and input data, and the number of humans showing the highest probability is determined based on the comparison result. Eq. (3) describes the case with the highest probability.

$$N = \operatorname{argmax}_n(P(\omega_n|x)), \quad \text{[Eq. 3]}$$

(n=1,2, ... )

FIG. 5 is an experimental result illustrating a relationship between channel state information and the number of humans in a first Fresnel zone when humans present on a radio link do not move. FIG. 6 is an experimental result illustrating a relationship between channel state information and the number of humans within a first Fresnel zone when humans present on a radio link move. In FIGS. 5 and 6, x-axis represents the amount of attenuation (CSI attenuation) of strength of a received radio signal calculated from the CSI, and y-axis represents the amount of temporal change (CSI standard deviation) of strength of a received radio signal.

Referring to FIGS. 5 and 6, in the presence of people in the first Fresnel zone having a radio link 31, 32 between a transmitter 11, 21 and a receiver 12, 22, radio waves are influenced by human bodies, and part of the radio waves may be absorbed, diffracted, or reflected by the human bodies. The more people in the first Fresnel zone, the more radio waves are affected, which then increases the degree of attenuation. The more people in the first Fresnel zone, the more reduced the strength of a received radio signal.

As the first Fresnel zone is crowded with more people, the amount of attenuation in the strength of a received radio signal will be increased, and the radio signal strength will be changed unreliably over time due to diffraction, reflection, and so on.

It may be checked that there exists an apparent correlation between the number of humans present in the first Fresnel zone and the CSI. To estimate the number of humans by using the relationship, the present disclosure may determine the number of humans on a radio link accurately without involving separate user devices or additional devices based on an amount of attenuation and an amount of temporal change of strength of a received radio signal.

To demonstrate the effect of the present disclosure, an experiment was conducted according to the present disclosure. In the experiment, a first Fresnel zone of a radio link was generated by using an AP equipped with the Intel WiFi Link 5300 network interface card and a receiver. CSI data were collected while 1 to 9 people were moving or were not moving on the corresponding radio link, and an analysis result of the CSI data was obtained.

FIG. 7 illustrates an experimental setting when only one person is present in a laboratory. FIG. 8 illustrates an experimental setting when three people are present in the laboratory. In the experiments, transmitters and receivers were disposed at those positions shown in FIGS. 7 and 8.

FIG. 9 is an experimental result illustrating estimates according to the present disclosure (DFC) and a comparative example (RSSI) when people on a radio link do not move. FIG. 10 is an experimental result illustrating estimates according to the present disclosure (DFC) and a comparative example (RSSI) when people on a radio link move. The comparative example uses a method for estimating the number of humans based on change of received signal strength indicator (RSSI). The experimental results of FIGS. 9 and 10 show the case where an estimation error of the number of humans is included, and cumulative distribution functions (CDFs) which include the estimation error of the number of humans were obtained. Through performance evaluation using the experimental result, the number of humans on a radio link was calculated for the respective cases according to the present disclosure and the comparative example. Experimental results were compared in a comprehensive manner for a static scenario where people do not move as in FIGS. 9 and 10 and a dynamic target scenario where people are allowed to move randomly. To demonstrate validity of the experiment, the number of humans was set to 0, 1, 3, 5, 7, and 9; and the estimation results of the number of humans on a radio link were analyzed and compared.

Referring to FIG. 9, in the static target scenario according to the present disclosure, the number of humans on a radio link was estimated by DFC with an accuracy of 76%, 30%, 27%, 25%, and 16% for the case of 1, 3, 5, 7, and 9 people, respectively. On the other hand, in the case of the comparative example, the accuracy was measured by RSSI as 27%, 44%, 2.8%, 1.2%, and 43% for the case of 1, 3, 5, 7, and 9 people, respectively.

Referring to FIG. 10, in the dynamic target scenario according to the present disclosure, the number of humans on a radio link was estimated by DFC with an accuracy of 95%, 59%, 10%, 46%, and 67% for the case of 1, 3, 5, 7, and 9 people, respectively. On the other hand, in the case of the comparative example, the accuracy was measured by RSSI as 33%, 42%, 12%, 1.2%, and 18% for the case of 1, 3, 5, 7, and 9 people, respectively.

FIG. 11 shows experimental results of both DFC and RSSI, illustrating accuracy of an estimate of the number of humans when people on a radio link do not move. FIG. 12 shows experimental results of both DFC and RSSI, illustrating accuracy of an estimate of the number of humans when people on a radio link move. As may be seen from the experimental results of FIGS. 11 and 12, when people move on a radio link, a lot of reflection, diffraction, and attenuation of radio waves occur during the communication process of a radio signal.

It should be understood by those skilled in the art from the descriptions given above that various modifications and variations may be made without departing from the technical spirit or scope of the present disclosure. Therefore, the technical scope of the present disclosure is not limited to the specifications provided in the detailed descriptions of this document but has to be defined by the appended claims.

The invention claimed is:

1. An indoor device-free human counting system, comprising:
    a transmitter and a receiver forming a radio link through which a radio signal is transmitted; and
    a human counting unit configured to
        measure an amount of a amplitude attenuations of the subcarriers of a received radio signal over time and an amount of the amplitudes of the subcarriers of the received radio signal over time by analyzing the radio signal received by the receiver,
        calculate a CSI average attenuation based on acquiring a weighted average of the amplitude attenuations of the subcarriers of a received radio signal over time,
        calculate CSI average variation based on acquiring a weighted average of the standard deviations of the amplitudes of the subcarriers of the received radio signal over time,
        calculate a probability distribution by approximating to the normal distribution based on the CSI average attenuation and CSI average variation of the received radio signal, and
        estimate a number of humans within a Fresnel zone of the radio link based on the calculation result.

2. The system of claim 1, wherein the received radio signal includes Channel State Information (CSI).

3. The system of claim 2, wherein the human counting unit comprises:
    a learning unit configured to learn the number of humans present on the radio link in advance by calculating probability distributions between the CSI and the number of humans based on an amount of the amplitude attenuations of the subcarriers of the received radio signal over time and an amount of the amplitude changes of the subcarriers of the received radio signal over time; and
    a validation unit configured to
        measure an amount of the amplitude attenuations of the subcarriers of a radio signal received through a radio link in an indoor environment over time and an amount of the amplitudes of the subcarriers of the received radio signal over time,
        estimate the number of humans present on the radio link by selecting a case with the highest probability among the probability distributions obtained by the learning unit from the calculation result, and
        output human counting information including the number of humans.

4. An indoor device-free human counting method, comprising:
    forming a radio link through which a radio signal is transmitted between a transmitter and a receiver; and
    measuring an amount of a amplitude attenuations of the subcarriers of a received radio signal over time and an amount of a amplitudes of the subcarriers of the received radio signal over time by analyzing the radio signal received by the receiver, calculating a CSI average attenuation based on acquiring a weighted average of the amplitude attenuations of the subcarriers of a received radio signal over time, calculating CSI average variation based on acquiring a weighted average of the standard deviations of the amplitudes of the subcarriers of the received radio signal over time, calculating a probability distribution by approximating to the normal distribution based on the CSI average attenuation and CSI average variation of the received radio signal, and estimating the number of humans present within a Fresnel zone of the radio link based on the calculation result.

5. The method of claim 4, wherein the estimating of the number of humans within the Fresnel zone of the radio link comprises:
    learning the number of humans present on the radio link in advance by calculating probability distributions between a Channel State information (CSI) and the number of humans based on an amount of the amplitude attenuations of the subcarriers of the received radio signal over time and an amount of the amplitude changes of the subcarriers of the received radio signal over time; and
    measuring an amount of the amplitude attenuations of the subcarriers of a radio signal received through a radio link in an actual indoor environment over time and an amount of the amplitudes of the subcarriers of the received radio signal over time and estimating the number of humans present on the radio link by selecting a case with the highest probability among probability distributions obtained in advance from the learning by using the calculation result.

6. An indoor device-free human counting system, comprising:

a receiver configured to measure, based on Channel State Information (CSI) of a received radio signal, an amount of the amplitude attenuations of the subcarriers of a received radio signal over time and an amount of the amplitudes of the subcarriers of the received radio signal over time, calculate a CSI average attenuation based on acquiring a weighted average of the amplitude attenuations of the subcarriers of a received radio signal over time, calculate CSI average variation based on acquiring a weighted average of the standard deviations of the amplitudes of the subcarriers of the received radio signal over time, calculate a probability distribution by approximating to the normal distribution based on the CSI average amplitude and CSI average variation of the received radio signal, and estimate, based on the calculation result, a number of objects within a Fresnel zone of the received radio signal.

7. The system of claim 6, the receiver comprising:

a learning unit configured to learn, in a first environment, the number of objects in the received radio signal based on a probability distribution between the CSI and the number of objects from the amount of the amplitude attenuations of the subcarriers of the received radio signal over time and the amount of the amplitude changes of the subcarriers of the received radio signal over time.

8. The system of claim 7, wherein the receiver further comprising:

a validation unit configured to measure, in a second environment, the amount of the amplitude attenuations of the subcarriers of the received radio signal over time and the amount of the amplitudes of the subcarriers of the received radio signal over time, estimate the number of objects within the first Fresnel zone by selecting a case with a highest probability among the probability distributions obtained by the learning unit, and output the number of objects.

* * * * *